United States Patent
Barry

[11] 3,916,658
[45] Nov. 4, 1975

[54] PROTECTING

[76] Inventor: John D. A. Barry, 146 Winthrop St., Brookline, Mass. 02146

[22] Filed: Mar. 10, 1975

[21] Appl. No.: 556,548

[52] U.S. Cl. ............... 70/417; 70/252; 180/114; 200/61.54; D8/113
[51] Int. Cl.² .................................. B60R 25/02
[58] Field of Search ......... 70/54, 55, 252, 417, 418, 70/423, 447, 454, 455; 180/114; 200/44, 61.54; D8/113

[56] References Cited
UNITED STATES PATENTS
| | | | |
|---|---|---|---|
| 3,083,563 | 4/1963 | Greenwald | 70/417 |
| 3,811,303 | 5/1974 | Robertson | 70/237 |

*Primary Examiner*—Albert G. Craig, Jr.

[57] ABSTRACT

This application discloses the steerin column of an automobile having mounted thereon a conventional ignition lock which is substantially enclosed by an armoring band.

12 Claims, 5 Drawing Figures

PROTECTING

BACKGROUND OF THE INVENTION

This invention relates to the protection of automobiles against theft.

In most automobiles sold today, the ignition switchlock assembly is mounted in the steering column. The most common method of stealing such automobiles is to pull the lock out of the steering column. The force required to do this is often only slightly greater than that required to pull the cork from a bottle of wine. Once the lock has been pulled out, the automobile may be started by turning the ignition switch (which remains in the steering column) with a screwdriver.

The prior art has provided several different types of structure in attempts to overcome this problem and prevent unauthorized removal of the ignition lock. U.S. Pat. No. 3,665,738, for example, discloses a device including a movable blocking arm which may be positioned over the outer end of the ignition lock. U.S. Pat. No. D227,547 discloses a similar structure in which a hinged collar fits over the lock. In both of these prior art devices, the protective structure that covers the ignition lock must itself be locked in place. Thus, although they provide some protection against theft, these systems have serious disadvantages. The protective structure over the ignition lock must be unlocked and moved out of the way each time the vehicle is driven; and must be repositioned and locked in place after each use. Further, the anti-theft protection provided is limited by the strength of the lock used to hold the covering protective in place. A padlock, such as that shown in U.S. Pat. No. 3,665,738 or apparently intended for use with the device of U.S. Pat. No. D227,547, is no real barrier to a determined or competent thief.

SUMMARY OF THE INVENTION

It is a principal object of the present invention to provide a simple and inexpensive anti-theft mechanism that, without additional keys or locks, effectively prevents the ignition lock from being removed from the steering column but still permits the vehicle to be operated in its normal manner, thereby insuring that a driver will not forget to reengage the theft protection mechanism after use. Other objects include providing such devices for use on existing automobiles without modification, and which are easy to install and virtually impossible to remove.

The invention features a protective device for preventing an ignition lock of the type including a rotatable key-controlled cylinder from being removed from a steering column in which it is mounted with the axis of the cylinder generally transverse to the axis of the steering column. The protective device comprises a plurality of arcuate collar portions arranged to be connected to each other to form a continuous band encircling the portion of the steering column in which the ignition lock is mounted, a circular cap secured by the band in position overlying the outer end of the ignition lock so that the cap is rotatable relative to the band about an axis generally coaxial to the axis of the lock cylinder, a key opening extending through the central portion of the cap permitting a key to be inserted into the cylinder, and portions of the band overlying and slidingly engaging portions of the cap lying in an annular ring radially outwardly of the key opening. In preferred embodiments in which the cap is mounted in a generally cylindrical bore extending through the collar portion and an annular flange at the outer end of the bore engages the annular ring portions of the cap, there are featured hollow ears on the cap for receiving the similar such ears on the head of the ignition lock, an annular flange inner diameter substantially equal to the length of the keyhole of the lock cylinder, a bore diameter substantially equal to the outer diameter of the cap, and a keyhole-shaped opening in the cap overlying and aligned with the keyhole of the lock cylinder.

Other objects, features and advantages will appear from the following detailed description of preferred embodiments of the invention, taken together with the attached drawings.

DESCRIPTION OF PREFERRED EMBODIMENTS

Figure 1:
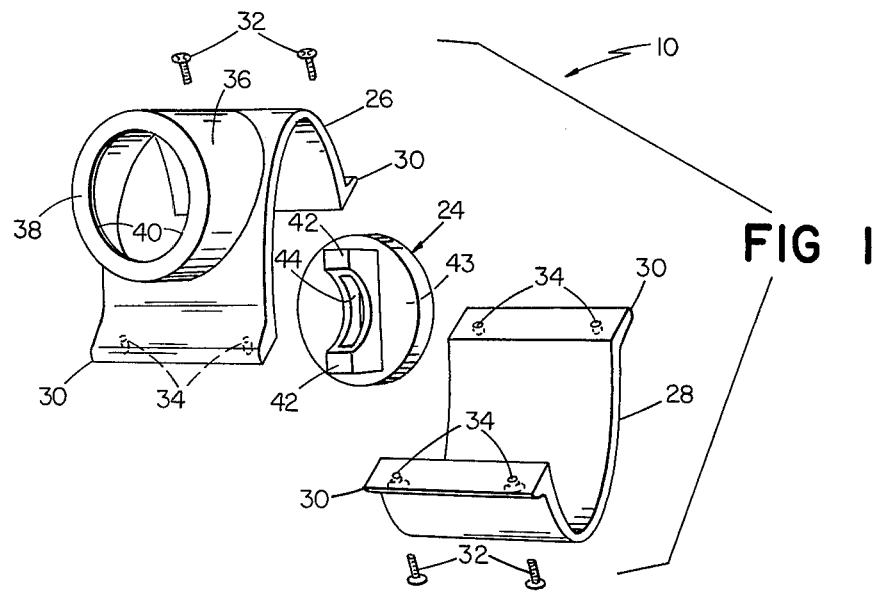
FIG. 1 is a perspective exploded view of a first preferred embodiment.
Figure 2:
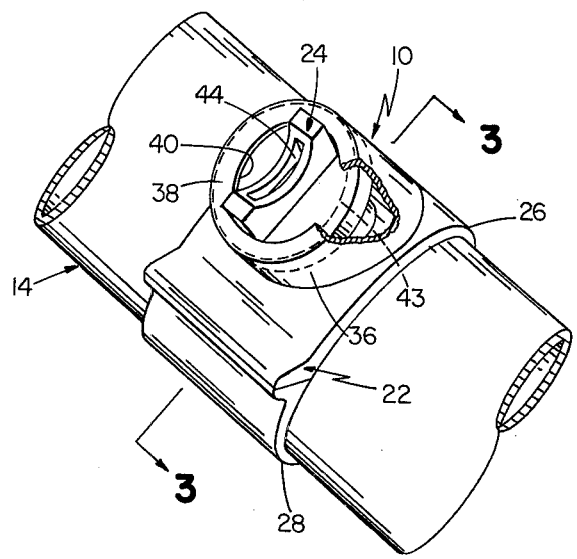
FIG. 2 is a perspective view, partially in section, of the embodiment of FIG. 1 installed on an automobile steering column.
Figure 3:
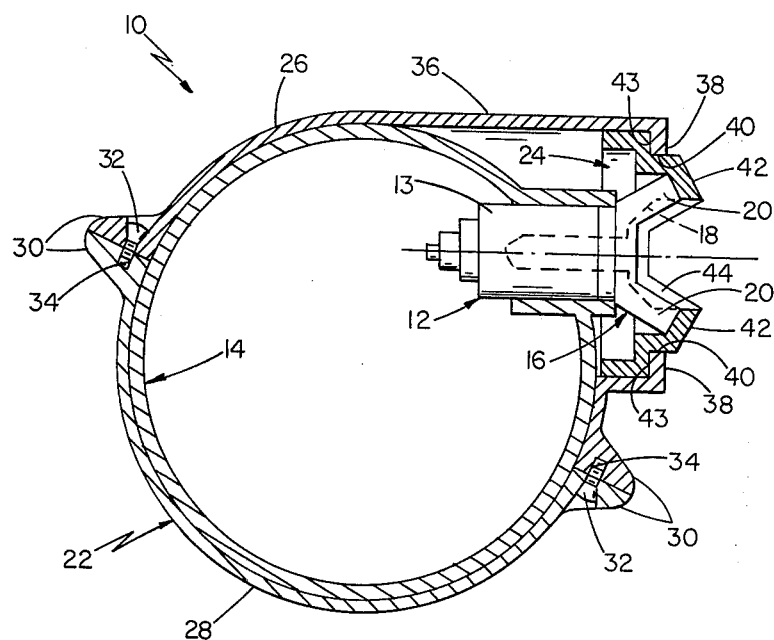
FIG. 3 is a sectional view, taken at 3—3 of FIG. 2.

Referring more particularly to the drawings, there is shown in FIGS. 1-3 a protective assembly, generally designated 10, for preventing an ignition lock 12 from being pulled out of the automobile steering column 14 in which it is mounted. As is conventional, ignition lock 12 projects slightly beyond the cylindrical periphery of steering column 14 with the axis of its key-controlled cylinder 13 generally perpendicular to the axis of steering column 14. The head 16 of lock 12 defines a keyhole 18 and includes also a pair of "ears" 20 at opposite ends of the keyhole which may be manually engaged to assist in turning the lock. Protective assembly 10 comprises a continuous steel band 22 snugly encircling the portion of steering column 14 in which lock 12 is mounted, and a hardened steel cap 24 mounted over the head 16 of lock 12.

As shown most clearly in FIGS. 1 and 2, band 22 includes a pair of arcuate collar members 26, 28, each subtending an arc of about 180° and having a projecting flange 30 at each end thereof. When the collar members are placed around steering column 14, the adjacent ends of the respective collar members are secured together by one-way screws 32 passing through recesses 34 in flanges 30. The width of band 22 is about equal to the length of a conventional hacksaw blade.

Collar member 26 includes a generally cylindrical projection or bore 36 arranged coaxially to surround the portion of ignition switch 12 which porjects beyond the cylindrical periphery of steering column 14. The inner diameter of projection 36 is slightly greater than the outer diameter of cap 24. An inwardly projecting annular lip 38 is provided at the outer end of projection 36, defining a circular opening 40 coaxial with projection 36 and having a diameter slightly greater than that of lock head 16.

Cap 24 comprises a generally circular hardened steel disc, having an outer diameter slightly less than the inner diameter of projection 36 so that the cap may be filled within the projection (See FIGS. 2 and 3) for rotation relative thereto with the peripheral portion of the cap engaging the underside of lip 38. The center portion of cap 24, within opening 40, includes a pair of outwardly projecting hollow "ears" 42 arranged to fit over the similar ears 20 of ignition lock head 16, an annular rim 43 extending radially beyond ears 42 and of width approximately equal to the width of lip 38, and, a keyhole 44 arranged to overlie the keyhole 18 of lock 12 and provide key access to the lock's key-controlled cylinder.

Figure 4:
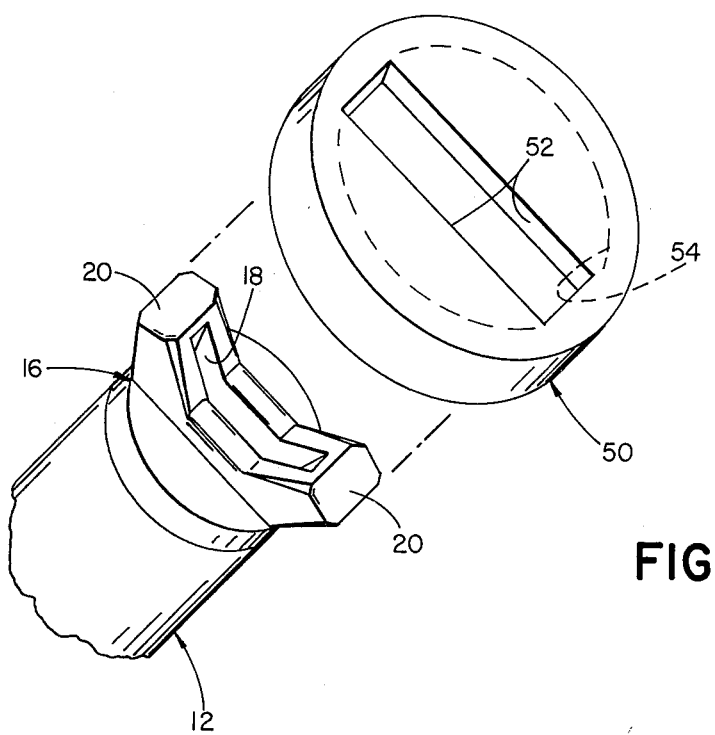
FIG. 4 is a perspective view of portions of a slightly simplified form of the embodiment of FIGS. 1-3.

If desired, a slightly simplified cap 50 (FIG. 4) may be used in lieu of cap 24. As shown, cap 50 does not include any hollow ears. Instead, a rectangular opening 52 extends diametrically across the face of the cap. The length and width of opening 50 are such that ears 20 of ignition switch head 16 will project therethrough. The annular portion 54 of the cap face radially beyond the ends of opening 52 will engage the underside of lip 38.

Collar members 26 and 28 also include openings (not shown) to allow the turn signal lever and hazard light control on steering column 14 to project therethrough.

In operation, cap 24 is fitted over the head 16 of ignition switch 12 so that ears 42 fit over switch ears 20, and keyholes 18 and 44 are aligned. Collar members 26, 28 are then placed in position surrounding steering column 14, with projection 36 of collar member 26 surrounding cap 24 and annular lip 38 engaging annular rim 43 of cap 24. Cap 24 is rotatable within projection 36, and the center of opening 40 and axes of rotation of cap 24 and the key cylinder of lock 12 coincide. Screws 32 are then inserted into recesses 34 permanently to secure the collar members together.

The automobile may be started in the conventional way. The ignition key is inserted into the ignition lock cylinder through aligned keyholes 18 of switch 12 and 44 of cap 24. The ignition switch is activated by turning the key, or by manually engaging ears 42, and rotatably turning cap 24 about the common axes of the cap and key cylinder. Since band 22 and cap 24 are of hardened steel, lip 38 makes it very difficult to pull ignition lock 12 out of steering column 14. It is also difficult to remove band 22 from the steering column since screws 32 are not easily removable and the width of band 22 is such that it is hard to attack with a hacksaw.

Figure 5:
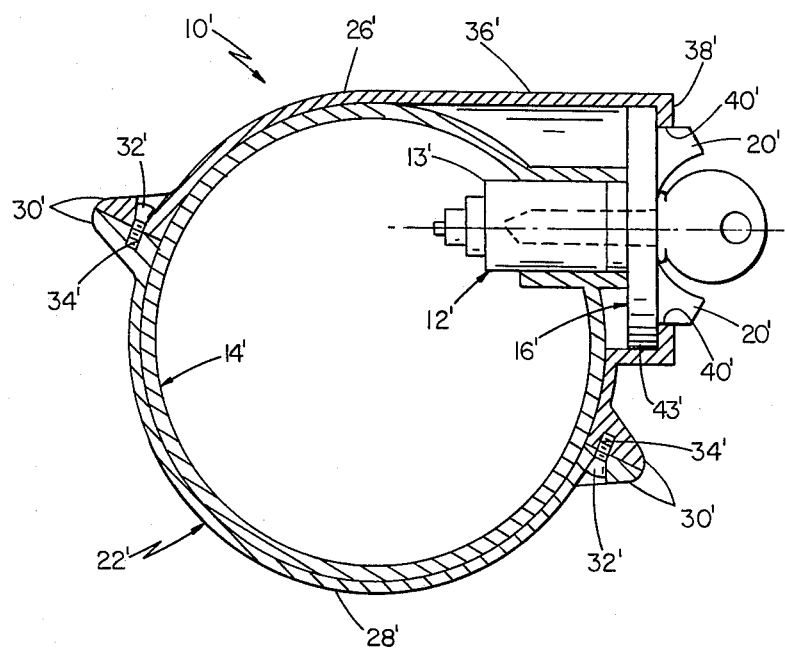
FIG. 5 is a sectional view of a second preferred embodiment installed on an automobile steering column.

Reference is now made to FIG. 5 wherein is disclosed a second embodiment, generally designated 10', of the present invention. Many portions of this second embodiment are similar or substantially identical to corresponding portions of the previously described assembly 10, and are identified by the same reference numeral as previously used with a differentiating prime (') added.

Protective assembly 10' is intended for use with automobiles in which the head of the ignition switch 12' has been modified. As shown, it differs from assembly 10 principally in that it does not include a separate cap overlying the outer end of the ignition switch. Instead, the head 16' of the ignition switch 12' has been modified to include an annular rim 43' extending radially beyond ears 20' a distance substantially equal to the width of annular lip 38'. The head 16' of ignition lock 12' is, of course, fixed relative to the key cylinder of the lock. When collar members 26', 28' are mounted on steering column 14', the head rim 43' engages the underside of lip 38' and prevents lock 12' from being pulled from the steering column.

Other embodiments will be within the scope of the following claims.

What is claimed is:

1. A protective device for preventing removal from an automobile steering column of an ignition lock of the type including a rotatable key-controlled cylinder, the lock being mounted with the axis of rotation of the cylinder generally transverse to the axis of the column, said device comprising:

a plurality of arcuate collar portions adapted to be connected to each other to form a continuous band encircling the portion of the column in which the lock is mounted; and, a circular cap adapted to be secured by the band in position overlying the outer end of the lock with the cap rotatable relative to the band about an axis generally coaxial with the axis of rotation of the cylinder, the cap including a key opening extending through the central portion thereof to permit a key to be inserted through the cap and into the cylinder, and portions of the band being positioned to overlie and slidingly engage portions of the face of the cap lying in an annular ring radially outwardly of the key opening when the collar portions encircle the steering column and the cap is in position overlying the outer end of the lock.

2. The device of claim 1 including means for permanently securing the collar portions together end-to-end to form the band.

3. The device of claim 1 wherein of the collar portions includes a cylindrical bore extending therethrough a direction generally radial of the band and an inwardly projecting annular flange at the outer end of the bore, the annular ring portions of the cap face engaging the flange.

4. The device of claim 3 wherein the ignition lock includes a cylindrical portion projecting beyond the cylindrical surface of the steering column, and the collar bore surrounds the projecting cylindrical portion.

5. The device of claim 3 wherein the inner diameter of the portion of the cylindrical bore defined by the flange is slightly greater than the overall diameter ignition lock.

6. The device of claim 3 wherein the ignition lock includes a head having a keyhole therein and the cap and head include cooperating means for aligning the cap relative to the head.

7. The device of claim 6 wherein the cooperating means includes a pair of projections adjacent opposite ends of the head keyhole and openings in the cap for receiving the projections when the cap is positioned over the outer end of the lock.

8. The device of claim 7 wherein the cap includes hollow projections into which the projections of the head fit when the cap is positioned over the outer end of the lock.

9. The device of claim 3 wherein the ignition lock includes a head having a keyhole therein, and the cap key opening is of substantially the same size thereas and is adapted to be aligned therewith.

10. The device of claim 3 wherein the cap comprises the head of the ignition lock and is fixed in position relative to the key cylinder with the cap key opening aligned with the keyhole of the key cylinder.

11. The device of claim 10 wherein the cap key opening is generally rectangular and extends diametrically of the cap, and the collar portion flange engages annular face portion of the cap radially outwardly of the cap key opening.

12. The device of claim 11 wherein the cap includes a projection adjacent each end of the cap opening, and the annular face portions of the cap engaging the flange extend radially therebeyond.

* * * * *